(12) United States Patent
Nagase

(10) Patent No.: US 6,843,142 B2
(45) Date of Patent: Jan. 18, 2005

(54) TORQUE SENSOR

(75) Inventor: Shigeki Nagase, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/816,088

(22) Filed: Apr. 1, 2004

(65) Prior Publication Data

US 2004/0194557 A1 Oct. 7, 2004

(30) Foreign Application Priority Data

Apr. 2, 2003 (JP) ......................................... 2003-099488

(51) Int. Cl.[7] .............................. G01L 3/02; G01L 3/10; G01L 3/12; G01L 3/14
(52) U.S. Cl. ................................................. 73/862.326
(58) Field of Search ........................... 73/862, 862.326, 73/862.08, 862.331, 862.332, 862.333, 862.338, 862.193, 862.321, 862.325, 862.335, 862.339

(56) References Cited

U.S. PATENT DOCUMENTS

| | | | |
|---|---|---|---|
| 4,453,420 A | | 6/1984 | Nakane et al. |
| 4,682,104 A | * | 7/1987 | Lombard et al. ...... 73/862.331 |
| 5,239,490 A | * | 8/1993 | Masaki et al. ............ 73/862.08 |
| 6,474,179 B1 | * | 11/2002 | Senda et al. ............ 73/862.331 |
| 6,536,293 B2 | * | 3/2003 | Shiba .................... 73/862.193 |

FOREIGN PATENT DOCUMENTS

| | | |
|---|---|---|
| EP | 1 134 567 | 9/2001 |
| JP | 2002-350181 | 12/2002 |

* cited by examiner

Primary Examiner—Edward Lefkowitz
Assistant Examiner—T Miller
(74) Attorney, Agent, or Firm—Jordan and Hamburg LLP

(57) ABSTRACT

The torque sensor outputs a sinusoidal first alternating signal the phase of which changes in accordance with change in the rotation angle of a first shaft, and a sinusoidal second alternating signal the phase of which changes in accordance with change in the rotation angle of a second shaft capable of performing relative rotation, elastically, with respect to the first shaft. A phase difference correspondence signal the waveform of which changes in accordance with change in the phase difference between the first alternating signal and the second alternating signal is output. A value corresponding to the torque transmitted by the first and second shafts is determined from the phase difference correspondence signal. This value corresponding to the transmitted torque is corrected on the basis of a value corresponding to the difference between a first distortion indicator value which changes in accordance with the waveform distortion in the first alternating signal and a second distortion indicator value which changes in accordance with the waveform distortion in the second alternating signal.

2 Claims, 10 Drawing Sheets

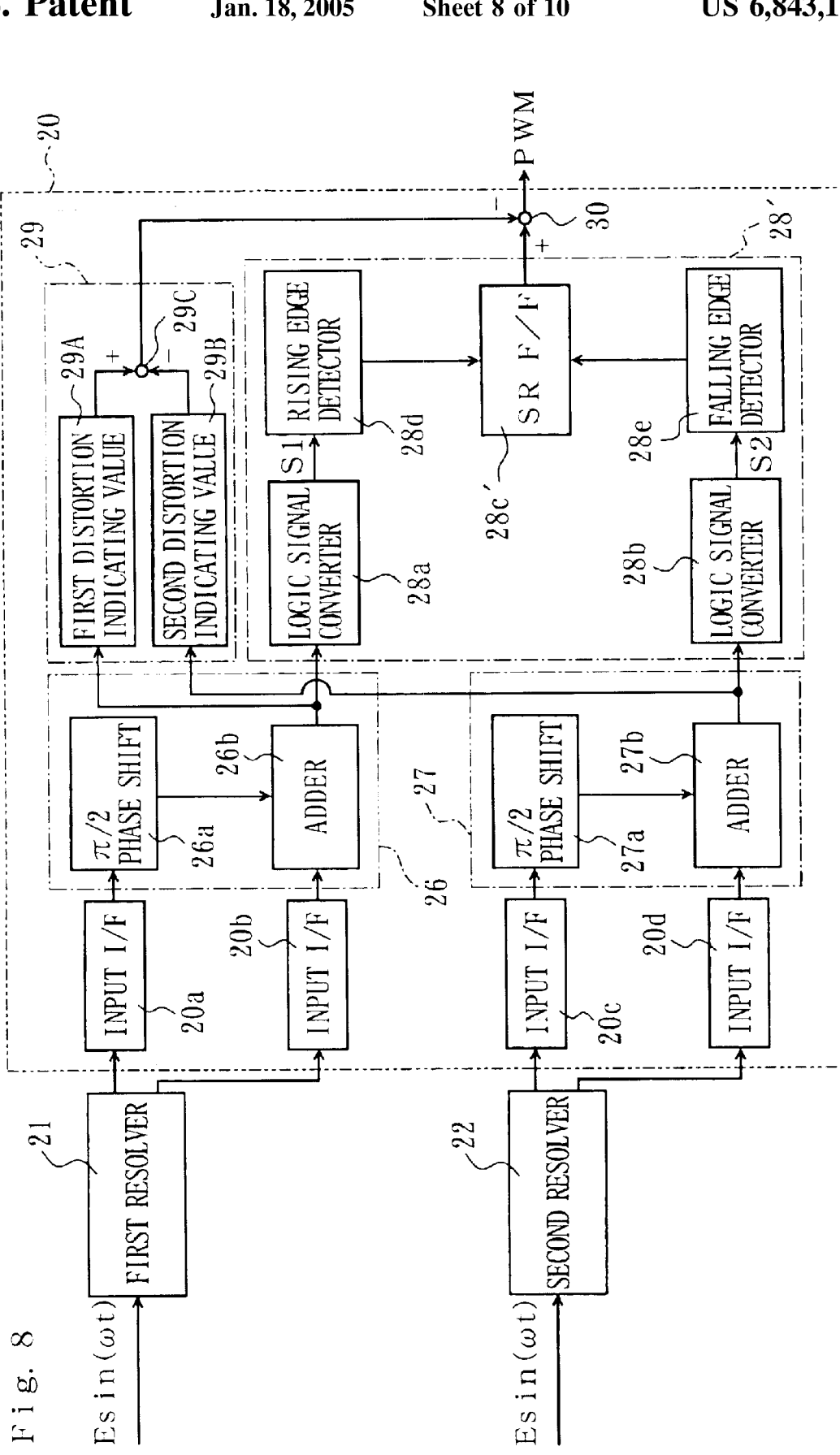

Fig. 9 (1)
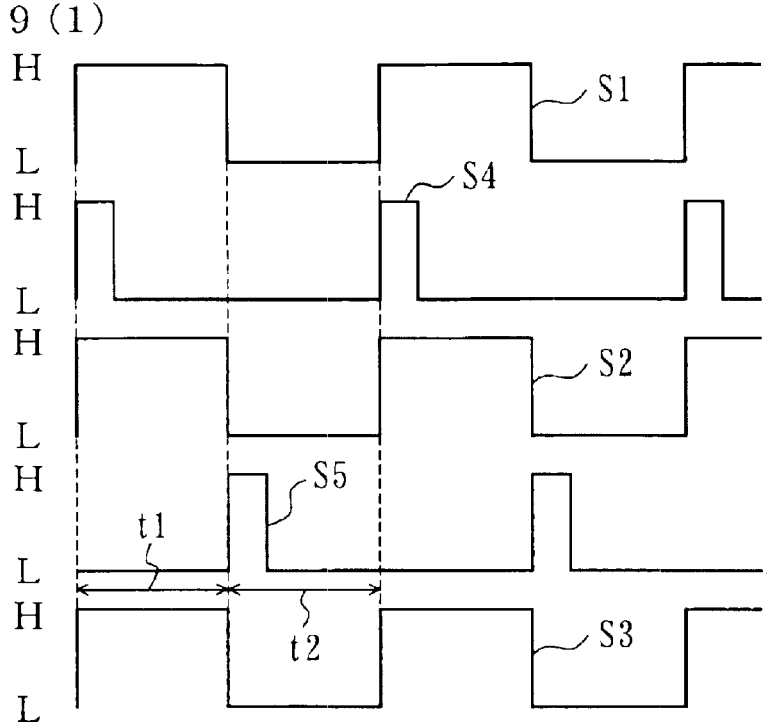
Fig. 9 (2)
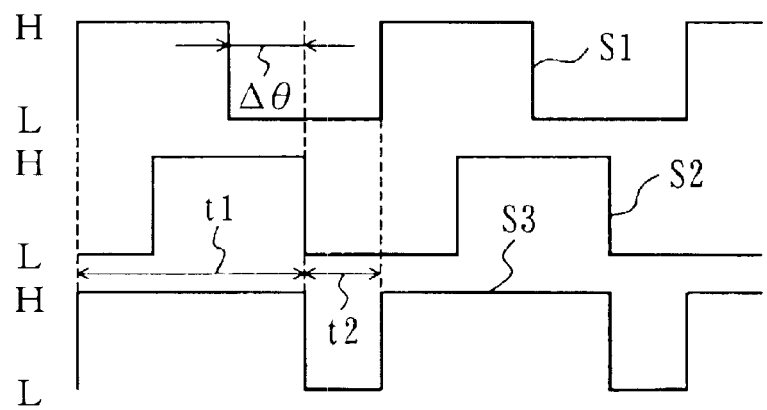
Fig. 9 (3)
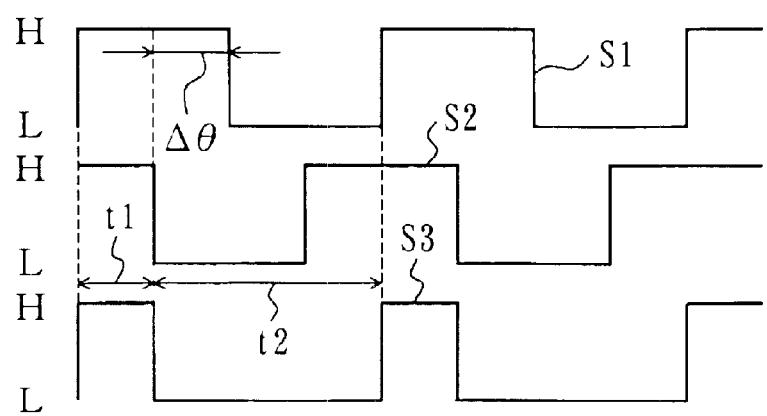

TORQUE SENSOR

FIELD OF THE INVENTION

The present invention relates to a torque sensor, which is used, for example, to detect the steering torque in an electric power steering apparatus.

DESCRIPTION OF THE RELATED ART

A torque sensor is known which comprises a first shaft, a second shaft capable of performing relative rotation, elastically, with respect to the first shaft, a first resolver for detecting the rotation angle of the first shaft and a second resolver for detecting the rotation angle of the second shaft. The torque transmitted by the two shafts is determined by the rotation angle of the first shaft as detected by the first resolver and the rotation angle of the second shaft as detected by the second resolver (Japanese Patent Laid-open No. 2002-350181).

Taking the rotation angle of the shaft as detected by the resolver to be $\theta$, the angular frequency of the excitation signal to be $\omega$, the time to be t, and KE to be a coefficient, then when an excitation signal proportional to $\sin(\omega t)$ has been input to the rotor coil of the resolver, a signal expressed by $KE \sin(\omega t)\sin\theta$ having an amplitude proportional to $\sin\theta$ and a signal expressed by $KE \sin(\omega t)\cos\theta$ having an amplitude proportional to $\cos\theta$ are output from two phase stator coils. Therefore, the rotation angle $\theta$ can be determined by calculating $\tan^{-1}(\sin\theta/\cos\theta)$ by means of a computer.

However, since there are limits on the resolution that can be achieved if a computer directly reads in the signal output value from detectors, such as resolvers, then the resolution of the torque sensor is restricted, and the workload involved in signal processing increases, as the resolution becomes higher. Moreover, since the output value changes in a non-linear fashion with respect to the rotation angle $\theta$, improvement in the torque detection accuracy is impeded. Moreover, there are always detection errors in the values of the rotation angles detected by the resolvers or the like, and there are individual differences in the detection errors. Therefore, if the torque transmitted by the shafts is determined from the detected rotation angle of the first shaft and the detected rotation angle of the second shaft, then the difference between the respective detection errors creates a torque detection error, and hence the torque detection accuracy declines. It is an object of the present invention to provide a torque sensor whereby the aforementioned problem can be resolved.

SUMMARY OF THE INVENTION

The torque sensor according to the present invention comprises a first shaft; a second shaft capable of performing relative rotation, elastically, with respect to the first shaft; a first alternating signal source which outputs a sinusoidal first alternating signal the phase of which changes in accordance with change in the rotation angle of the first shaft; a second alternating signal source which outputs a sinusoidal second alternating signal the phase of which changes in accordance with change in the rotation angle of the second shaft; an output signal processing section which outputs a phase difference correspondence signal the waveform of which changes in accordance with change in the phase difference between the first alternating signal and the second alternating signal; a determining part which determines a first distortion indicator value which changes in accordance with the waveform distortion of the first alternating signal; a determining part which determines a second distortion indicator value which changes in accordance with the waveform distortion of the second alternating signal; and a correcting part which corrects the value corresponding to the torque which is determined from the phase difference correspondence signal and transmitted by the first and second shafts, on the basis of a value corresponding to the difference between the first distortion indicator value and the second distortion indicator value.

According to the present invention, since the phase change in the first alternating signal corresponds to the change in the rotation angle of the first shaft, and the phase change in the second alternating signal corresponds to the change in the rotation angle of the second shaft, the phase difference between the first alternating signal and the second alternating signal corresponds to the difference between the angles of rotation of the first shaft and the second shaft. The waveform of the phase difference correspondence signal changes in accordance with change in the difference between these angles of rotation, and therefore the phase difference correspondence signal can be used as a signal that corresponds to the torque transmitted by the first and second shafts. In other words, it is possible to determine directly the difference in the rotation angle corresponding to the transmitted torque, without detecting the rotation angle of the first shaft and the rotation angle of the second shaft respectively. Therefore, in order to determine the torque, it is not necessary to directly read in signal output values from detectors by means of a computer, as in the prior art, and hence the workload involved in signal processing can be reduced and non-linear components can be eliminated.

Furthermore, in the torque sensor according to the present invention, even if the phase change in the first alternating signal does not correspond accurately to the change in the rotation angle of the first shaft due to error, and even if the phase change in the second alternating signal does not correspond accurately to the change in the rotation angle of the second shaft due to error, it is possible to determine a value corresponding to the torque transmitted by the two shafts without being affected by the difference between the respective errors. To be more precise, when there is an error in the phase change in the first alternating signal, this error is represented by a distortion in the waveform of the first alternating signal, and when there is an error in the phase change in the second alternating signal, this error is represented by a distortion in the waveform of the second alternating signal. Therefore, the difference between the first distortion indicator value which changes in accordance with the waveform distortion in the first alternating signal and the second distortion indicator value which changes in accordance with the waveform distortion in the second alternating signal corresponds to the difference between the error in the phase change in the first alternating signal and the error in the phase change in the second alternating signal. Therefore, it is possible to cancel out the effects of the difference between the respective errors by correcting the value corresponding to the transmitted torque, which is determined from the signal corresponding to the difference between the first alternating signal and the second alternating signal, on the basis of a value corresponding to the difference between the first distortion indicator value and the second distortion indicator value.

In the torque sensor according to the present invention, preferably, the time period from the time at which the value of the first alternating signal becomes zero until the time at which the integral value of the first alternating signal becomes zero is determined as the first distortion indicator value; and the time period from the time at which the value of the second alternating signal becomes zero until the time at which the integral value of the second alternating signal becomes zero, is determined as the second distortion indicator value. In a case where there is a waveform distortion in each alternating signal, the time period from the time at which the alternating signal become zero until the time at which it reaches a relative maximum value changes in comparison with a case where there is no waveform distortion, and therefore the time period can be used as an indicator expressing the amount of distortion. Moreover, the time period from the time at which the value of each sinusoidal alternating signal becomes zero until the time at which it reaches a relative maximum value corresponds to the time period from the time at which the value thereof becomes zero until the time at which the value of the cosine wave corresponding to the integral value thereof becomes zero. Therefore, it is possible to determine the first distortion indicator value and the second distortion indicator value readily by means of generic components, without detecting the relative maximum values of the alternating signals.

Preferably, the first alternating signal source has a first detector and a first signal processing section; taking KE as a coefficient, $\omega$ as the angular frequency of an excitation signal, t as the time and $\theta$ as the rotation angle of the first shaft, the first detector outputs a first sinusoidal amplitude signal expressed by KE $\sin(\omega t)\sin\theta$ and a first cosinusoidal amplitude signal expressed by KE $\sin(\omega t)\cos\theta$; the first signal processing section has a first phase shift circuit which shifts the phase of the first sinusoidal amplitude signal by $\pi/2$ to obtain a first phase shift signal expressed by KE $\sin(\omega t+\pi/2)\sin\theta$, and a first adding circuit which adds the first phase shift signal to the first cosinusoidal amplitude signal to obtain the first alternating signal expressed by KE $\sin(\omega t+\theta)$; the second alternating signal source has a second detector and a second signal processing section; taking KE as a coefficient, $\omega$ as the angular frequency of an excitation signal, t as the time and $\theta+\Delta\theta$ as the rotation angle of the second shaft, the second detector outputs a second sinusoidal amplitude signal expressed by KE $\sin(\omega t)\sin(\theta+\Delta\theta)$ and a second cosinusoidal amplitude signal expressed by KE $\sin(\omega t)\cos(\theta+\Delta\theta)$; and the second signal processing section has a second phase shift circuit which shifts the phase of the second sinusoidal amplitude signal by $\pi/2$ to obtain a second phase shift signal expressed by KE $\sin(\omega t+\pi/2)\sin(\theta+\Delta\theta)$, and a second adding circuit which adds the second phase shift signal to the second cosinusoidal amplitude signal to obtain the second alternating signal expressed by KE $\sin(\omega t+\theta+\Delta\theta)$.

Thereby, by inputting sinusoidal signals to the first and second detectors, a first and a second alternating signals the phases of which change in accordance with change in angles of rotation of the first and second shafts can be output by means of generic components, such as detectors, namely resolvers or the like, phase shift circuits and adding circuits.

Preferably, the first alternating signal source has a first detector which, taking KE as a coefficient, $\omega$ as the angular frequency of an excitation signal, t as the time and $\theta$ as the rotation angle of the first shaft, outputs a first alternating signal expressed by KE $\sin(\omega t+\theta)$; and the second alternating signal source has a second detector which, taking KE as a coefficient, $\omega$ as the angular frequency of an excitation signal, t as the time and $\theta+\Delta\theta$ as the rotation angle of the second shaft, outputs a second alternating signal expressed by KE $\sin(\omega t+\theta+\Delta\theta)$. Thereby, by inputting a sinusoidal signal and a cosinusoidal signal to the first and second detectors, it is possible to output first and second alternating signals the phase of which change in accordance with change in the angles of rotation of the first and second shafts, by means of generic components, such as detectors, namely resolvers or the like.

Preferably, the first detector and the second detector are disposed relatively to each other, in such a manner that the phase difference between the first alternating signal and second alternating signal becomes $\pi/2$ when the torque transmitted by the first and second shafts is zero; and the output signal processing section has a first logic signal conversion circuit for converting the first alternating signal to a first logic signal; a second logic signal conversion circuit for converting the second alternating signal into a second logic signal; and a PWM processing circuit for outputting a PWM signal corresponding to the exclusive OR of the first logic signal and the second logic signal as the phase difference correspondence signal.

Thereby, it is possible to output a PWM signal the pulse width of which changes in accordance with change in the phase difference between the first alternating signal and the second alternating signal, as the phase difference correspondence signal. Moreover, this PWM signal can be output by means of generic components, such as circuits for converting the alternating signals to logic signals, and a circuit for generating a signal corresponding to the exclusive OR of the logic signals.

Preferably, the output signal processing section has a first logic signal conversion circuit for converting the first alternating signal into a first logic signal; a second logic signal conversion circuit for converting the second alternating signal into a second logic signal; a detection circuit for the rise time of the first logic signal; a detection circuit for the fall time of the second logic signal; and a PWM processing circuit for outputting a PWM signal the rise time of which corresponds to one of either the rise time of the first logic signal or the fall time of the second logic signal, and the fall time of which corresponds to the other thereof, as the phase difference correspondence signal.

Thereby, it is possible to output a PWM signal the pulse width of which changes in accordance with change in the phase difference between the first alternating signal and the second alternating signal, as a phase difference correspondence signal. Moreover, this PWM signal can be output by means of generic components, such as circuits for converting the alternating signals to logic signals, circuits for detecting the rise time and fall time of the logic signals, and an SR flip-flop, for example, for generating a signal having a rise time and a fall time corresponding to the rise time and fall time of the logic signals.

According to the present invention, it is possible to provide a torque sensor of high accuracy and high resolution, at low cost.

BRIEF DESCRIPTION OF THE DRAWINGS

FIG. 2(2) is a diagram showing a first cosinusoidal amplitude signal in the torque sensor according to the embodiment of the present invention.

FIG. 4(2) is a diagram showing a first logic signal, a second logic signal and a PWM signal in a case where torque is transmitted in one direction, in the torque sensor according to the embodiment of the present invention; and FIG. 4(3) is a diagram showing a first logic signal, a second logic signal and a PWM signal in a case where torque is transmitted in the other direction, in the torque sensor according to the embodiment of the present invention.

FIG. 8 is a diagram showing the constitution of the signal processing section in the torque sensor according to the modification of the present invention.

FIG. 9(1) is a diagram showing a first logic signal, a second logic signal, a PWM signal, a rise time detection signal, and a fall time detection signal, in a case where the transmitted torque is zero, in a torque sensor according to a modification of the present invention; FIG. 9(2) is a diagram showing a first logic signal, a second logic signal, and a PWM signal, in a case where torque is transmitted in one direction, in the torque sensor according to the modification of the present invention; and FIG. 9(3) is a diagram showing a first logic signal, a second logic signal, and a PWM signal, in a case where torque is transmitted in the other direction, in the torque sensor according to the modification of the present invention.

DESCRIPTION OF THE PREFERRED EMBODIMENTS

Figure 1:
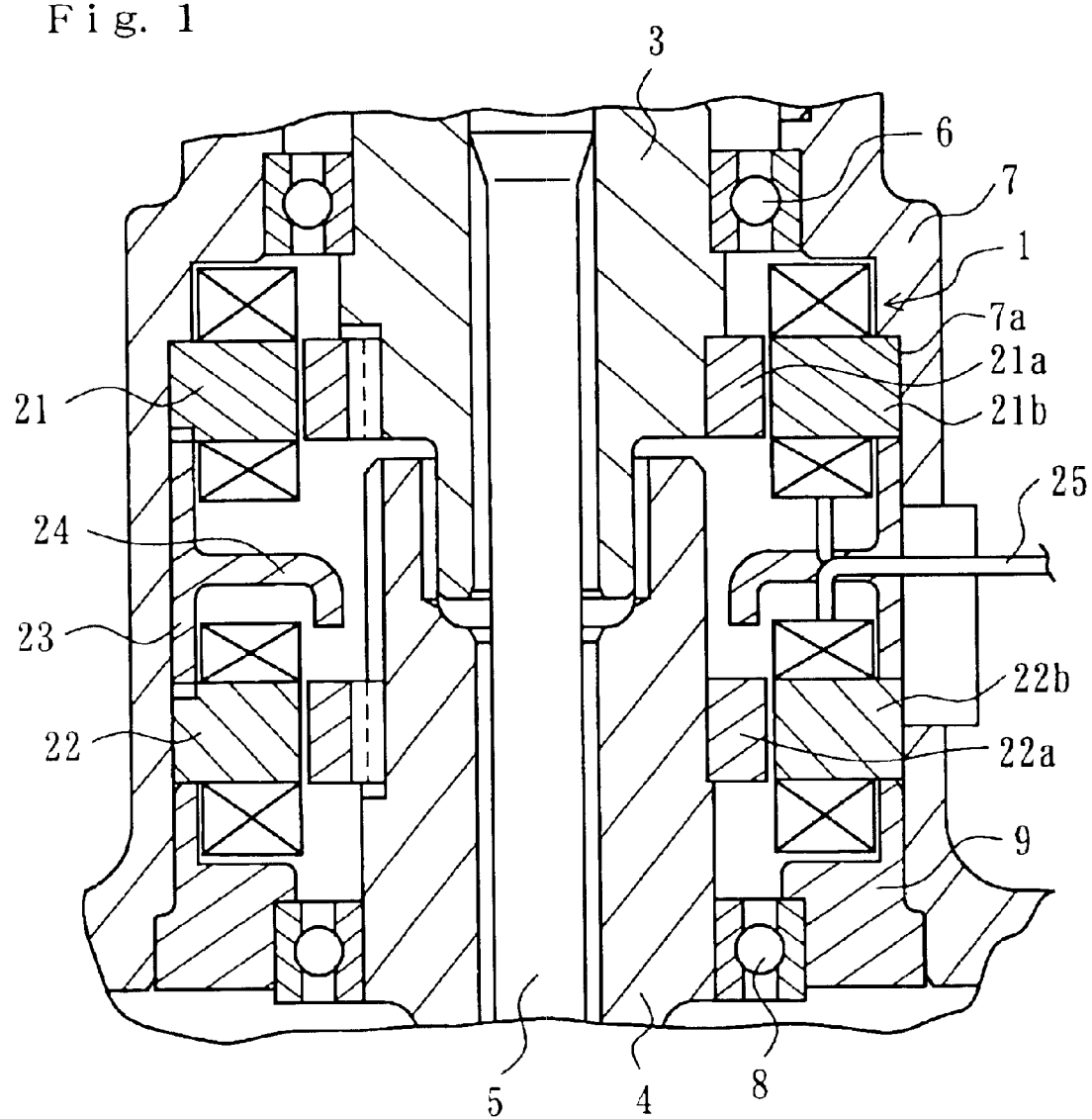
FIG. 1 is a cross-sectional view of a torque sensor according to an embodiment of the present invention.

The torque sensor 1 according to the present embodiment as illustrated in FIG. 1 is used in order to detect the torque transmitted to a steering shaft of an electric power steering apparatus, and it comprises a tubular first shaft 3 and a tubular second shaft 4 constituting the steering shaft. Rotation of a steering wheel (not illustrated) connected to the first shaft 3 is transmitted to vehicle wheels via a steering gear (not illustrated) which is connected to the second shaft 4, whereby the steering angle of the vehicle wheels is changed.

A torsion bar (elastic member) 5 is inserted into the first shaft 3 and the second shaft 4. One end of the torsion bar 5 is connected to the first shaft 3, and the other end thereof is connected to the second shaft 4, by means of a pin, serration or the like, respectively, and thus the first shaft 3 and the second shaft 4 can be rotated relatively to each other, elastically, about a common axis. The first shaft 3 is supported via a bearing 6 by a sensor housing 7, and the second shaft 4 is supported via a bearing 8 by a ring-shaped resolver pressing element 9 press-fitted into the sensor housing 7. A first resolver (first detector) 21 and a second resolver (second detector) 22 are covered by the sensor housing 7.

The first resolver 21 has a first resolver rotor 21a which is fitted onto the external circumference of the first shaft 3 in such a manner that it rotates together with the first shaft 3, and a ring-shaped first resolver stator 21b which covers the first resolver rotor 21a. In the present embodiment, the first resolver 21a rotates together with the first shaft 3 by means of the first shaft 3 being press-fitted into the first resolver rotor 21a. The second resolver 22 has a second resolver rotor 22a which is fitted onto the external circumference of the second shaft 4 in such a manner that it rotates together with the second shaft 4, and a ring-shaped second resolver stator 22b which covers the second resolver rotor 22a. In the present embodiment, the second resolver rotor 22a rotates together with the second shaft 4 by means of the second shaft 4 being press-fitted into the second resolver rotor 22a. A tubular spacer 23 is disposed between the first resolver stator 21b and the second resolver stator 22b.

The first resolver stator 21b, the second resolver stator 22b and the spacer 23 are fitted into the internal circumference of the sensor housing 7 along the axial direction of the shafts with a clearance in the radial direction of the first and second shafts 3, 4. These two resolver stators 21b, 22b and the spacer 23 are fixed to the sensor housing 7, by being sandwiched between the resolver pressing element 9 and a step 7a formed in the inner circumference of the sensor housing 7. A ring-shaped magnetic shielding part 24 extending in an inward direction from the inner circumference of the spacer 23 is formed from a magnetic shielding material, in an integral fashion with the spacer 23. A magnetic shield is created between the first resolver 21 and the second resolver 22 by the magnetic shielding section 24.

Figure 2:
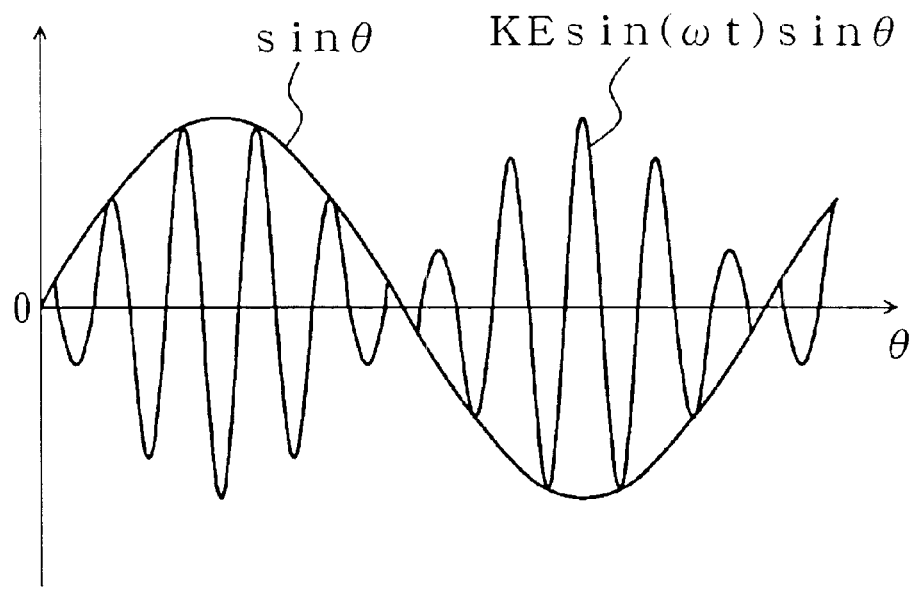
FIG. 2(1) is a diagram showing a first sinusoidal amplitude signal in the torque sensor according to the embodiment of the present invention.
Figure 2:
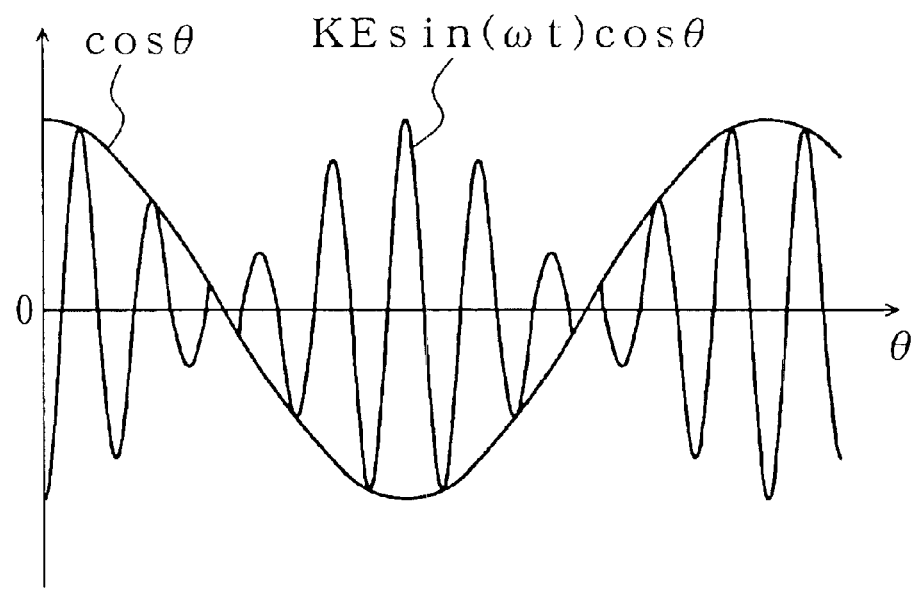

The first resolver 21 outputs a first sinusoidal amplitude signal and a first cosinusoidal amplitude signal from two phase coils (not illustrated) provided in the first resolver stator 21b, by inputting an excitation signal to a coil (not illustrated) provided in the first resolver rotor 21a. To be more precise, if the excitation signal is taken to be $E \sin(\omega t)$ and the rotation angle of the first shaft 3 is taken to be $\theta$, then the first sinusoidal amplitude signal has an amplitude proportional to $\sin \theta$, and is expressed by $KE \sin(\omega t)\sin \theta$. FIG. 2(1) shows the change in $\sin \theta$ and $KE \sin(\omega t)\sin \theta$, with respect to change in $\theta$, when the first shaft 3 turns at a constant angular speed. Moreover, the first cosinusoidal amplitude signal has an amplitude proportional to $\cos \theta$, and is expressed by $KE \sin(\omega t)\cos \theta$. FIG. 2(2) shows the change in $\cos \theta$ and $KE \sin(\omega t)\cos \theta$, with respect to change in $\theta$, when the first shaft 3 turns at a constant angular speed. E is the signal amplitude, K is the transformation ratio, $\omega$ is the angular excitation frequency, and t is time.

The second resolver 22 outputs a second sinusoidal amplitude signal and a second cosinusoidal amplitude signal, from two phase coils (not illustrated) provided in the second resolver stator 22b, by inputting an excitation signal to a coil (not illustrated) provided in the second resolver rotor 22a. If the excitation signal is taken to be $E \sin(\omega t)$, and the rotation angle of the second shaft 4 is taken to be $\theta+\Delta\theta$, then the second sinusoidal amplitude signal has an amplitude proportional to $\sin(\theta+\Delta\theta)$, and is expressed by $KE \sin(\omega t)\sin(\theta+\Delta\theta)$, and the second cosinusoidal amplitude signal has an amplitude proportional to $\cos(\theta+\Delta\theta)$ and is expressed by $KE \sin(\omega t)\cos(\theta+\Delta\theta)$.

Figure 3:
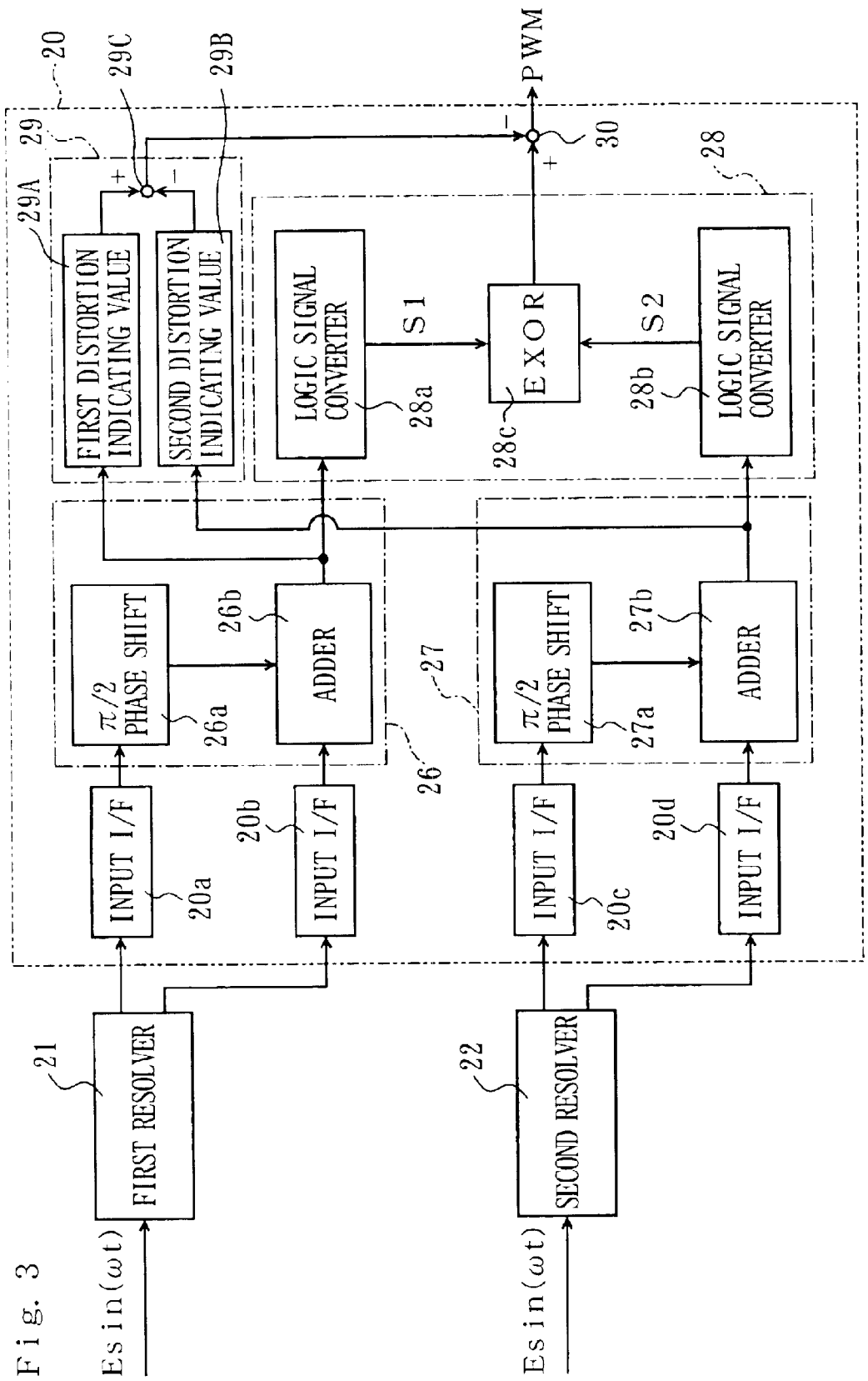
FIG. 3 is a diagram showing the constitution of a signal processing section in the torque sensor according to the embodiment of the present invention.

The output signals from the two resolvers 21, 22 are input, via a signal cable 25, to a control device 20 provided externally to the sensor housing 7 as illustrated in FIG. 3. The control device 20 has a first signal processing section 26, a second signal processing section 27, an output signal processing section 28, and a waveform distortion detecting section 29.

The first signal processing section 26 has a first phase shift circuit 26a and a first adding circuit 26b. The first phase shift circuit 26a shifts the phase of the first sinusoidal amplitude signal supplied from the first resolver 21 via the input interface 20a by $\pi/2$ to obtain a first phase shift signal expressed by KE $\sin(\omega t+\pi/2)\sin\theta$. The first adding circuit 26b adds this first phase shift signal to the aforementioned first cosinusoidal amplitude signal supplied from the first resolver 21 via the input interface 20b to obtain a first alternating signal expressed by KE $\sin(\omega t+\pi/2)\sin\theta$+KE $\sin(\omega t)\cos\theta$=KE $\cos(\omega t)\sin\theta$+KE $\sin(\omega t)\cos\theta$=KE $\sin(\omega t+\theta)$. In other words, the first resolver 21 and the first signal processing section 26 constitute a first alternating signal source which outputs a sinusoidal first alternating signal the phase of which changes in accordance with change in the rotation angle $\theta$ of the first shaft 3, when a sinusoidal excitation signal is input.

The second signal processing section 27 has a second phase shift circuit 27a and a second adding circuit 27b. The second phase shift circuit 27a shifts the phase of the second sinusoidal amplitude signal supplied from the second resolver 22 via the input interface 20c by $\pi/2$ to obtain a second phase shift signal expressed by KE $\sin(\omega t+\pi/2)\sin(\theta+\Delta\theta)$. The second adding circuit 27b adds this second phase shift signal to the aforementioned second cosinusoidal amplitude signal supplied from the second resolver 22 via the input interface 20d to obtain a second alternating signal expressed by KE $\sin(\omega t+\pi/2)\sin(\theta+\Delta\theta)$+KE $\sin(\omega t)\cos(\theta+\Delta\theta)$=KE $\cos(\omega t)\sin(\theta+\Delta\theta)$+KE $\sin(\omega t)\cos(\theta+\Delta\theta)$=KE $\sin(\omega t+\theta+\Delta\theta)$. In other words, the second resolver 22 and the second signal processing section 27 constitute a second alternating signal source which outputs a sinusoidal second alternating signal the phase of which changes in accordance with change in the rotation angle $\theta+\Delta\theta$ of the second shaft 4, when a sinusoidal excitation signal is input.

The first resolver 21 and the second resolver 22 are disposed relatively to each other, in such a manner that the phase difference between the first alternating signal and the second alternating signal is $\pi/2$, when the torque transmitted by the first and second shafts 3, 4 is zero.

The output signal processing section 28 has a first logic signal converting circuit 28a, a second logic signal conversion circuit 28b, and a PWM processing circuit 28c.

The first logic signal conversion circuit 28a converts the first alternating signal into a first logic signal. The first logic signal is represented by a binary square wave which takes the value H or L, and which has the same frequency as the first alternating signal. The second logic signal conversion circuit 28b converts the second alternating signal into a second logic signal. The second logic signal is represented by a binary square wave which takes the value H or L, and which has the same frequency as the second alternating signal. The phase difference between the first alternating signal and the second alternating signal becomes equal to the phase difference between the first logic signal and the second logic signal.

Figure 4:
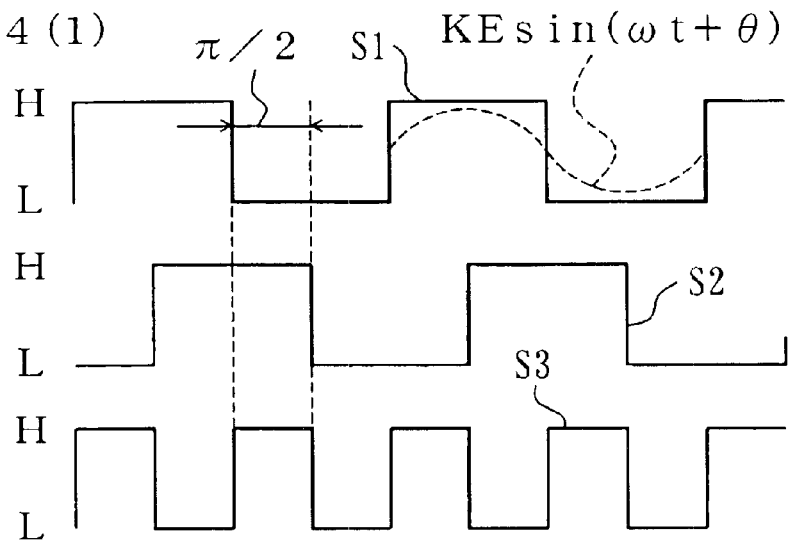
FIG. 4(1) is a diagram showing a first logic signal, a second logic signal and a PWM signal in a case where the transmitted torque is zero, in the torque sensor according to the embodiment of the present invention.
Figure 4:
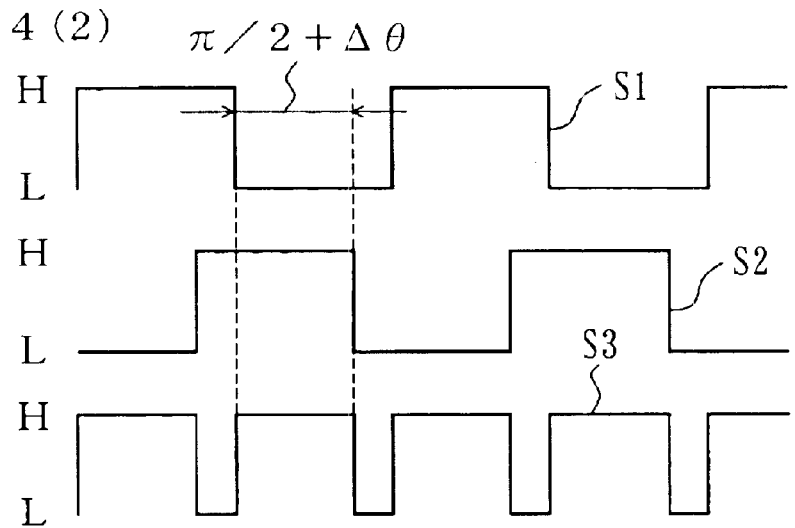
Figure 4:
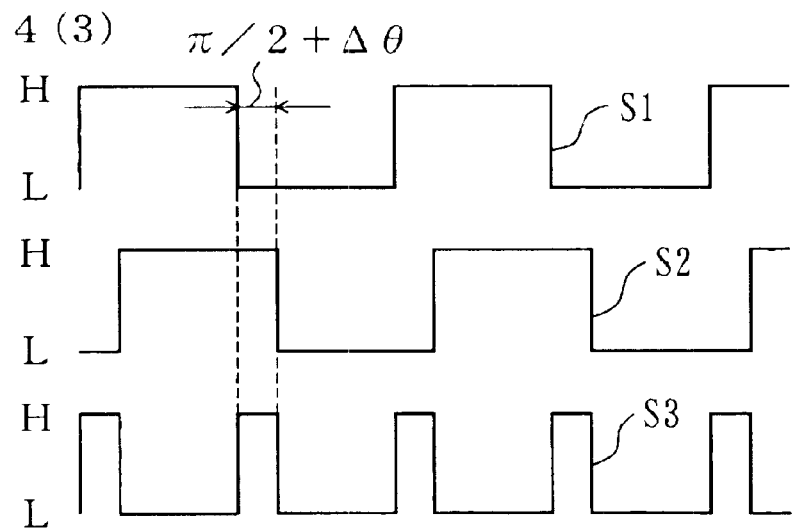

The PWM processing circuit 28c outputs a PWM signal corresponding to an exclusive OR (EXOR) of the first logic signal and the second logic signal. In the present embodiment, the PWM duty determined from the PWM signal is used as a value corresponding to the torque transmitted by the first and second shafts 3, 4. To be more precise, FIG. 4(1) shows a first logic signal S1, a second logic signal S2, and a PWM signal S3 output by the PWM processing circuit 28c, when the transmitted torque is zero. In this case, $\Delta\theta=0$, the phase difference between the first logic signal S1 and the second logic signal S2 is $\pi/2$, the PWM duty is 50%. FIG. 4(2) shows a first logic signal S1, a second logic signal S2, and a PWM signal S3 in a case where torque is transmitted in one direction by the first and second shafts 3, 4. In this case, the phase difference between the first logic signal S1 and the second logic signal S2 is $\pi/2+\Delta\theta(\Delta\theta>0)$, and as the transmitted torque increases, the PWM duty rises above 50%. FIG. 4(3) shows a first logic signal S1, a second logic signal S2 and a PWM signal S3 in a case where torque is transmitted in the other direction by the first and second shafts 3, 4. In this case, the phase difference between the first logic signal S1 and the second logic signal S2 is $\pi/2+\Delta\theta$ ($\Delta\theta<0$), and as the transmitted torque increases, the PWM duty decreases below 50%.

Since the phase change in the first alternating signal corresponds to the change in the rotation angle of the first shaft 3, and the phase change in the second alternating signal corresponds to the change in the rotation angle of the second shaft 4, then the phase difference between the first alternating signal and the second alternating signal corresponds to the transmitted torque, which corresponds to the difference in the rotation angle of the first shaft 3 and the second shaft 4. Since this phase difference between the first alternating signal and the second alternating signal is equal to the phase difference between the first logic signal S1 and the second logic signal S2, then the PWM signal S3 corresponding to the exclusive OR of the first logic signal S1 and second logic signal S2 is a phase difference correspondence signal the waveform of which changes as the pulse width changes in accordance with the change in the phase difference between the first alternating signal and the second alternating signal. This PWM signal S3 is used as a signal corresponding to the torque transmitted by the first and second shafts 3, 4, and therefore, the aforementioned PWM duty is a value corresponding to the torque transmitted by the first and second shafts 3, 4.

The waveform distortion detecting section 29 has a first distortion indicator value calculating section 29A as a determining part which determines a first distortion indicator value which changes in accordance with the waveform distortion of the first alternating signal, and a second distortion indicator value calculating section 29B as a determining part which determines a second distortion indicator value which changes in accordance with the waveform distortion of the second alternating signal.

Figure 5:
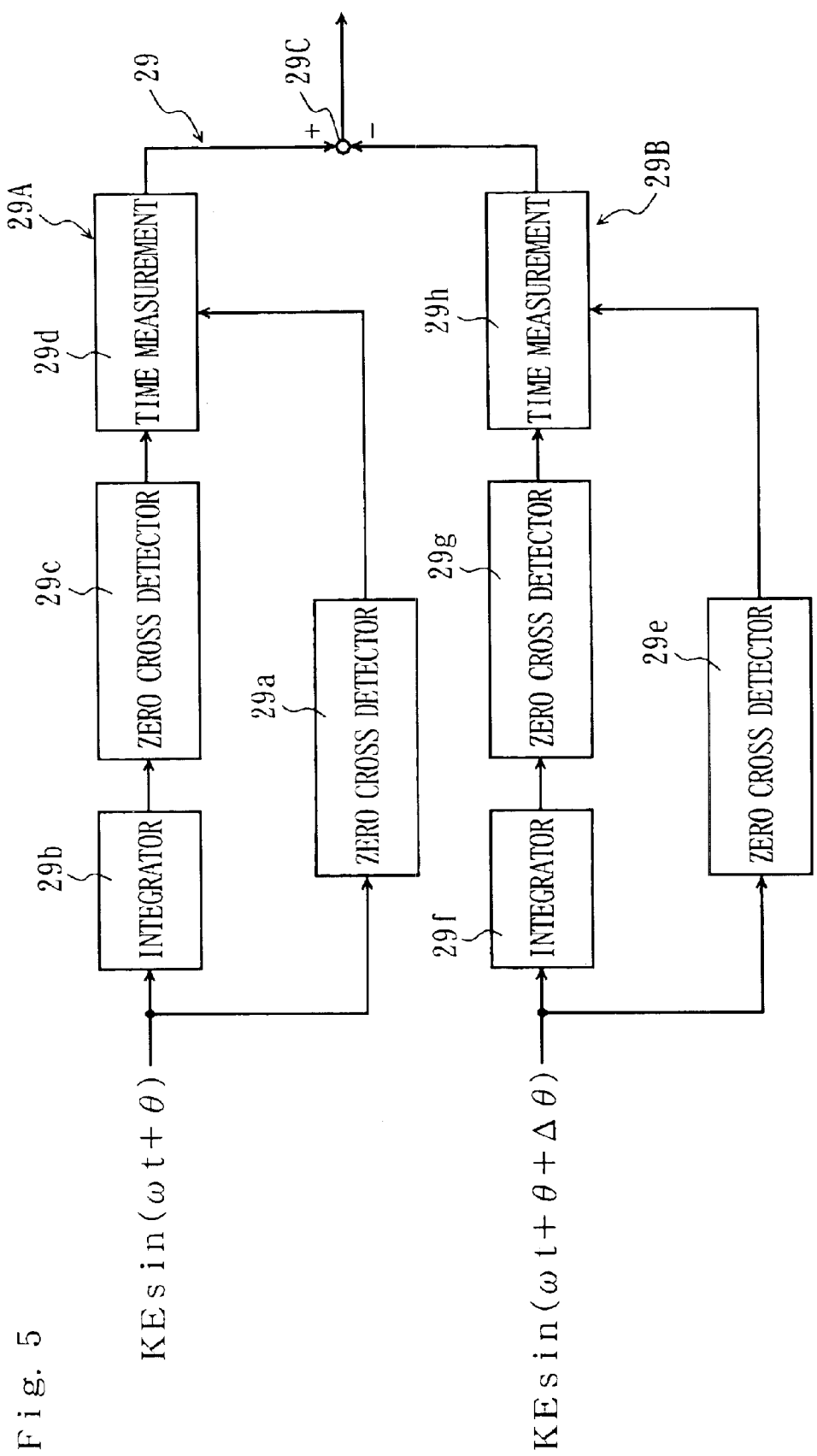
FIG. 5 is a diagram showing the constitution of a waveform distortion detecting section in the torque sensor according to the embodiment of the present invention.

As shown in FIG. 5, the first distortion indicator value calculating section 29A has a zero-cross detecting circuit 29a for detecting the time at which the value of the first alternating signal rises from zero, an integrating circuit 29b for integrating the first alternating signal, a zero-cross detecting circuit 29c for detecting the time at which the integrated value of the first alternating signal rises from zero, and a time calculating circuit 29d for determining the time period from the time at which the value of the first alternating signal becomes zero until the time at which the integrated value of the first alternating signal becomes zero, as a first distortion indicator value, on the basis of the detection signals from the respective detecting circuits 29a, 29c. The second distortion indicator value calculating section 29B has a zero-cross detecting circuit 29e for detecting the time at which the value of the second alternating signal rises from zero, an integrating circuit 29f for integrating the second alternating signal, a zero-cross detecting circuit 29g for detecting the time at which the integrated value of the second alternating signal rises from zero, and a time calculating circuit 29h for determining the time period from the time at which the value of the second alternating signal becomes zero until the time at which the integrated value of the second alternating signal becomes zero, as a second distortion indicator value, on the basis of the detection signals from the respective detecting circuits 29e, 29f.

Figure 6:
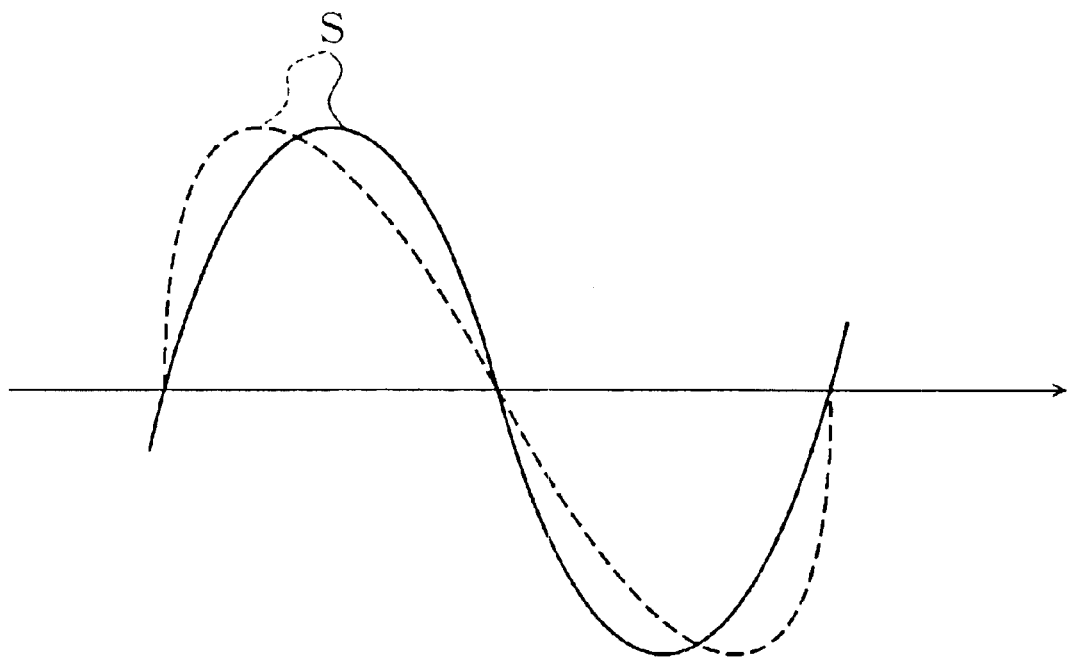
FIG. 6 is a diagram showing the waveform of respective alternating signals in the torque sensor according to the embodiment of the present invention.
Figure 7:
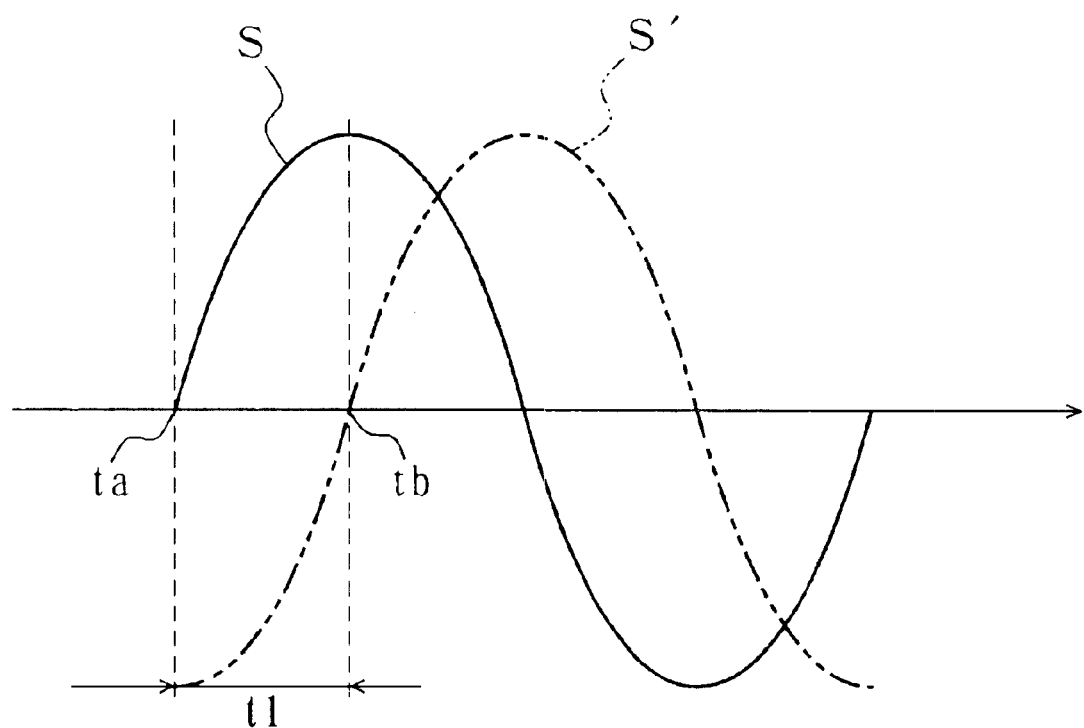
FIG. 7 is an illustrative diagram of the function of the torque sensor according to the embodiment of the present invention.

If there is no error in the phase changes of the respective alternating signals corresponding to the change in the rotation angle of the respective shafts 3, 4, then each of the alternating signals S has sinusoidal waveform, as indicated by the solid line in FIG. 6. If the phase changes in the respective alternating signals don't correspond accurately to the changes in the rotation angles of the respective shafts 3, 4, due to detection error caused by runout or the like of the resolver rotors 21a, 22a in the resolvers 21, 22, then the waveform of each alternating signal S is distorted as indicated by the broken line in FIG. 6, for example. In case where a distortion has occurred in either alternating signal S, then the time period from the time at which the value of the alternating signal S becomes zero until the time at which it reaches a relative maximum value changes in comparison with a case where there is no waveform distortion. Therefore, in FIG. 7, the time period from the time ta at which the value of each alternating signal S is zero until the time tb at which it reaches a relative maximum value corresponds to the time period t1 from the time ta at which this value becomes zero until the time tb at which the value of the cosine wave S', which corresponds to the integrated value of each alternating signal as indicated by the double-dotted line in FIG. 7, becomes zero. In other words, each distortion indicator value changes in accordance with the waveform distortion of each of the alternating signals, and therefore the degree of waveform distortion can be represented by each distortion indicator value, and each distortion indicator value can be determined readily by means of generic components.

The difference between the determined first distortion indicator value and the determined second distortion indicator value is determined by an error calculating section 29C, and this difference is subtracted from the aforementioned PWM duty corresponding to the torque transmitted by the first and second shafts 3, 4 by the error calculating section 30. Thereby, a correcting part, which corrects the value corresponding to the transmitted torque determined from the phase difference correspondence signal by a value corresponding to the difference between the first distortion indicator value and the second distortion indicator value, is constituted.

In the present embodiment, steering assist power corresponding to the torque transmitted by the first and second shafts 3, 4 is calculated from the previously determined and stored relationship between the PWM duty and the steering assist power, and an electric actuator (not illustrated) for generating the steering assist power is controlled in such a manner that it generates the steering assist power thus calculated. A commonly known system can be used for this electric actuator for generating the steering assist power, for example, a system can be used wherein the steering assist power generated by an electric motor is transmitted to the steering shaft by means of a reduction gear mechanism.

According to the torque sensor 1 of the aforementioned embodiment, it is possible to determine directly the difference in the rotation angle, which corresponds to the transmitted torque, without detecting the rotation angle of the first shaft 3 and the rotation angle of the second shaft 4 respectively. Therefore, there is no need to directly read in the respective output values for the sinusoidal signal and the cosinusoidal signal in order to determine the torque, as in the prior art, and hence the workload required for signal processing can be reduced and non-linear components can be eliminated.

Moreover, even if the change in the phase of the first alternating signal does not correspond accurately to the change in the rotation angle of the first shaft 3 due to error, and the change in the phase of the second alternating signal does not correspond accurately to the change in the rotation angle of the second shaft 4 due to error, it is possible to determine a value corresponding to the torque transmitted by the two shafts 3, 4, without being affected by the difference between the two errors. In other words, if there is an error in the phase change in the first alternating signal, this error is represented as a distortion in the waveform of the first alternating signal, and if there is an error in the phase change in the second alternating signal, then this error is represented as a distortion in the waveform of the second alternating signal. Consequently, the difference between the first distortion indicator value which changes in accordance with the waveform distortion of the first alternating signal and the second distortion indicator value which changes in accordance with the waveform distortion of the second alternating signal corresponds to the difference between the error in the phase change in the first alternating signal and the error in the phase change in the second alternating signal. Therefore, it is possible to cancel out the effects of the difference between the two errors by correcting the value corresponding to the transmitted torque, which is determined from the signal corresponding to phase difference between the first alternating signal and the second alternating signal, by a value corresponding to the difference between the first distortion indicator value and the second distortion indicator value.

Moreover, in the aforementioned embodiment, it is possible to output a first and a second alternating signal by means of generic components, viz. the resolvers 21, 22, the phase shift circuits 26a, 27a, and the adding circuits 26b, 27b, and moreover, it is also possible to output a PWM signal the pulse width of which changes in accordance with change in the phase difference between the first alternating signal and the second alternating signal, by means of generic components, viz. the logic signal conversion circuits 28a, 28b for converting the alternating signals into logic signals, and the PWM processing circuit 28c for generating a signal corresponding to the exclusive OR of the logic signals.

FIG. 8, FIG. 9(1), FIG. 9(2) and FIG. 9(3) show a modification of the control device 20. Here, the difference from the embodiment described above is that the first resolver 21 and the second resolver 22 are positioned relatively in such a manner that the phase difference between the first alternating signal and the second alternating signal becomes zero when the torque transmitted by the first and second shafts 3, 4 becomes zero. The output signal processing section 28' has a rise time detecting circuit 28d for the first logic signal which is output from the first logic signal conversion circuit 28a, and a fall time detecting circuit 28e for the second logic signal which is output from the second logic signal conversion circuit 28b. The PWM processing circuit 28c' has an SR (Set Reset) flip-flop, instead of a circuit for outputting the PWM signal which corresponds to the exclusive OR of the first logic signal and the second logic signal. The rise time detection signal for the first logic signal is input to the S terminal of the flip-flop constituting the PWM processing circuit 28c', and the fall time detection signal for the second logic signal is input to the R terminal thereof. Accordingly, a PWM signal is output from the PWM processing circuit 28c'. The PWM duty of this PWM signal corresponds to the torque transmitted by the first and second shafts 3, 4.

To be more precise, FIG. 9(1) shows a first logic signal S1, a second logic signal S2, a PWM signal S3 output by the PWM processing circuit 28c', a rise time detection signal S4, and a fall time detection signal S5, in a case where the transmitted torque is zero. In this case, Δθ=0, the phase difference between the first logic signal and the second logic signal is zero, and since the time period t1 from the rise time of the first logic signal until the fall time of the second logic signal is equal to the time period t2 from the fall time of the second logic signal until the rise time of the first logic signal, then the PWM duty is 50%. FIG. 9(2) shows the first logic signal S1, the second logic signal S2 and the PWM signal S3 in a case where torque is transmitted in one direction by the first and second shafts 3, 4. In this case, the phase difference between the first logic signal and the second logic signal becomes Δθ(>0), and the time period t1 from the rise time of the first logic signal until the fall time of the second logic signal is longer than the time period t2 from the fall time of the second logic signal until the rise time of the first logic signal, and therefore as the transmitted torque increases, the PWM duty rises above 50%. FIG. 9(3) shows the first logic signal S1, the second logic signal S2 and the PWM signal S3 in a case where a torque is transmitted in the other direction by the first and second shafts 3, 4. In this case, the phase difference between the first logic signal and the second logic signal becomes Δθ(<0), and the time period t1 from the rise time of the first logic signal until the fall time of the second logic signal is shorter than the time period t2 from the fall time of the second logic signal until the rise time of the first logic signal, and therefore as the transmitted torque increases, the PWM duty decreases below 50%. Accordingly, it is possible to output a PWM signal the pulse width of which changes in accordance with change in the phase difference between the first alternating signal and the second alternating signal, by means of generic components, viz. the logic signal conversion circuits 28a, 28b for converting alternating signals into logic signals, the circuits 28d, 28e for detecting the rise time and fall time of logic signals, and the SR flip-flop for generating a signal having a rise time and a fall time which correspond to the rise time and fall time of the logic signals. The rest parts are the same as those of the foregoing embodiment, and the same parts are labeled with the same reference numerals. The fall time detection signal for the second logic signal can be input to the S terminal of the SR flip-flop constituting the PWM processing circuit 28c', and the rise time detection signal for the first logic signal can be input to the R terminal thereof. Therefore, the PWM processing circuit 28c' can outputs a phase difference correspondence signal in the form of a PWM signal the rise time of which corresponds to one of either the rise time of the first logic signal or the fall time of the second logic signal, and the fall time of which corresponds to the other thereof.

The present invention is not limited to the aforementioned embodiment or modification.

For example, in the aforementioned embodiment and modification, the first and second alternating signals are output by respectively adding the first and second phase shift signal, which are obtained by shifting the phase of the first and second sinusoidal amplitude signals output by the first and second resolvers 21, 22, to the first and second cosinusoidal amplitude signals, but it is also possible to output the first and second alternating signals directly from the first and second resolvers 21, 22. To be more precise, it is also possible to output a first alternating signal expressed by KE sin(ωt+θ) from the coil of the first resolver rotor 21a by inputting excitation signals expressed by E sin(ωt) and E cos(ωt) to the two phase coils of the first resolver stator 21b, and to output a second alternating signal expressed by KE sin(ωt+θ+Δθ) from the coil of the second resolver rotor 22a by inputting excitation signals expressed by E sin(ωt) and E cos(ωt) to the two phase coils of the second resolver stator 22b. In this case, the first signal processing section 26 and the second signal processing section 27 in the aforementioned embodiment are not required for the alternating signal source. Thereby, it is possible to output the first and second alternating signals by means of resolvers 21, 22, which are generic components, and hence the constitution can be simplified further.

Figure 10:
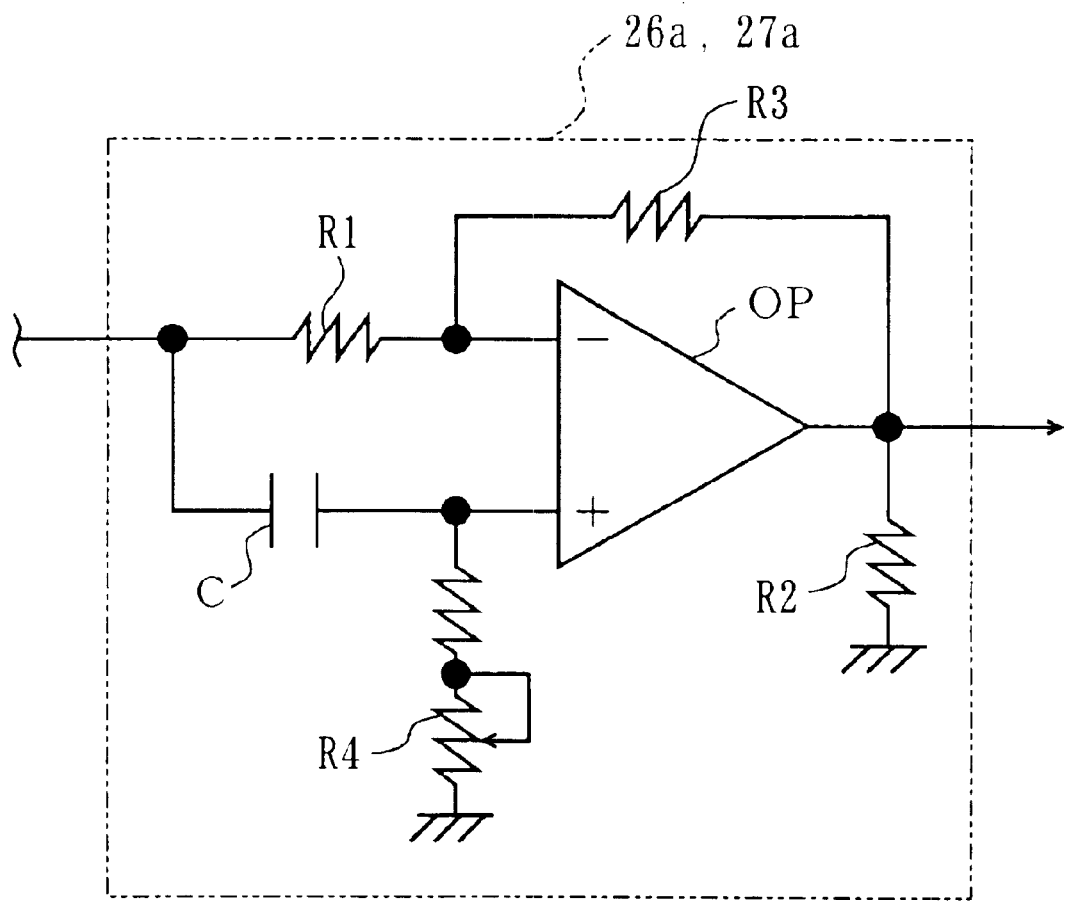
FIG. 10 is a diagram showing the constitution of a phase shift circuit in a torque sensor according to a modification of the present invention.

Moreover, as shown in FIG. 10, it is also possible to provide adjusting parts to adjust the amount of phase shift in the first phase shift circuit 26a and the second phase shift circuit 27a. To be more precise, in each of the phase shift circuits 26a, 27a, a sinusoidal amplitude signal is input to the inverting input terminal of an operational amplifier OP via a resistance R1, and to the non-inverting input terminal of the operational amplifier OP via a capacitor C, the output terminal of the operational amplifier OP is earthed via a resistance R2, the phase shift signal output by the operational amplifier OP is supplied as negative feedback via a resistance R3, and an earth connection is provided between the capacitor C and the operational amplifier OP via a variable resistance R4. By changing the resistance value of the variable resistance R4, it is possible to adjust the amount of phase shift in the sinusoidal amplitude signal. Thereby, it is possible to eliminate errors from the amount of phase shift in the first and second sinusoidal amplitude signals, when these signals are phase-shifted by π/2.

Moreover, in the foregoing embodiment and modification example, the PWM duty of the PWM signal output by the output signal processing section 28, 28' is used as a value corresponding to the transmitted torque, but it is also possible to use the time integral of the PWM signal as a value corresponding to the transmitted torque.

What is claimed is:

1. A torque sensor comprising:

a first shaft a second shaft capable of performing relative rotation, elastically, with respect to said first shaft;

a first alternating signal source which outputs a sinusoidal first alternating signal the phase of which changes in accordance with change in the rotation angle of said first shaft;

a second alternating signal source which outputs a sinusoidal second alternating signal the phase of which changes in accordance with change in the rotation angle of said second shaft;

an output signal processing section which outputs a phase difference correspondence signal the waveform of which changes in accordance with change in the phase difference between said first alternating signal and said second alternating signal;

a determining part which determines a first distortion indicator value which changes in accordance with the waveform distortion of said first alternating signal;

a determining part which determines a second distortion indicator value which changes in accordance with the waveform distortion of said second alternating signal; and a correcting part which corrects the value corresponding to the torque which is determined from said phase difference correspondence signal and transmitted by said first and second shafts, on the basis of a value corresponding to the difference between said first distortion indicator value and said second distortion indicator value.

2. The torque sensor according to claim 1, wherein the time period from the time at which the value of said first alternating signal becomes zero until the time at which the integral value of said first alternating signal becomes zero is determined as said first distortion indicator value, and wherein the time period from the time at which the value of said second alternating signal becomes zero until the time at which the integral value of said second alternating signal becomes zero is determined as said second distortion indicator value.

* * * * *